Oct. 22, 1940.　　　C. F. NORBERG　　　2,218,621
STORAGE BATTERY
Filed Sept. 7, 1938
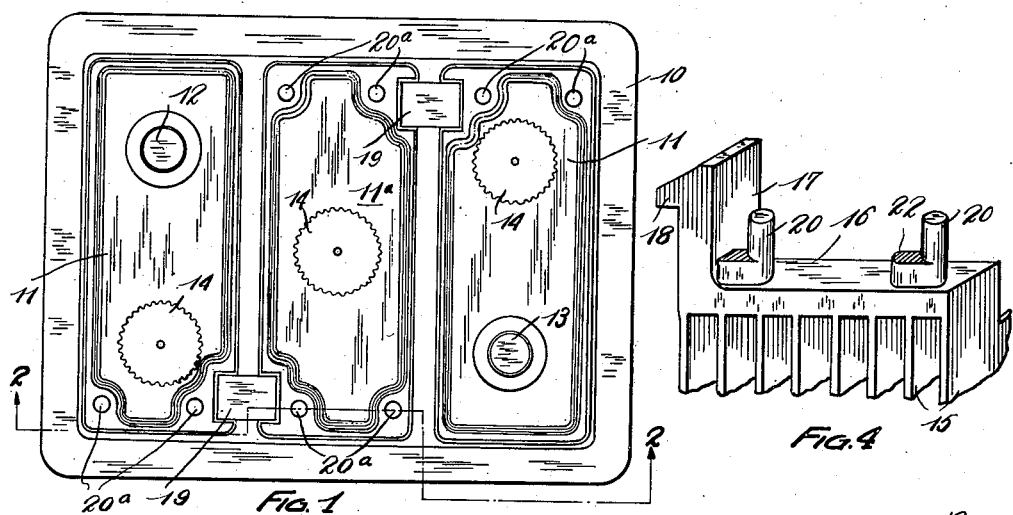
Fig. 1
Fig. 4
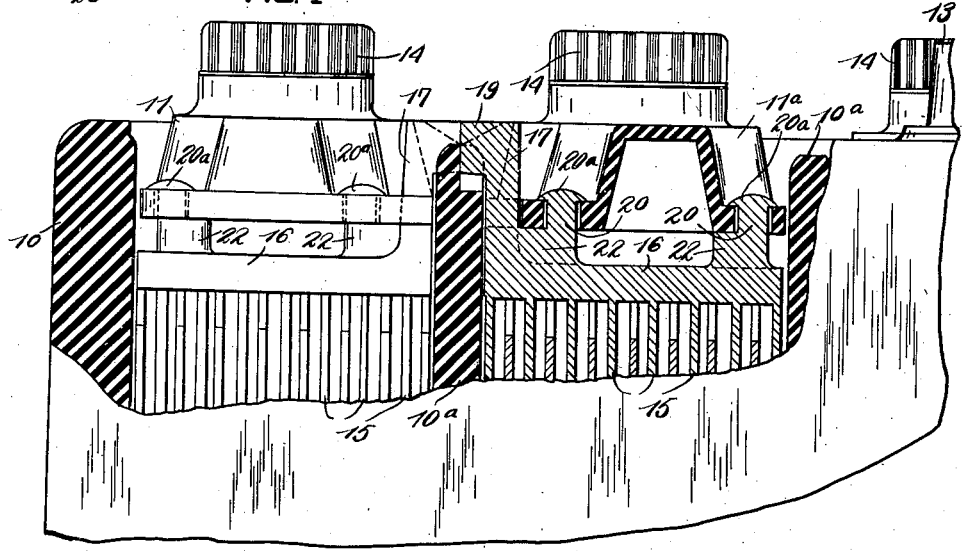
Fig. 2
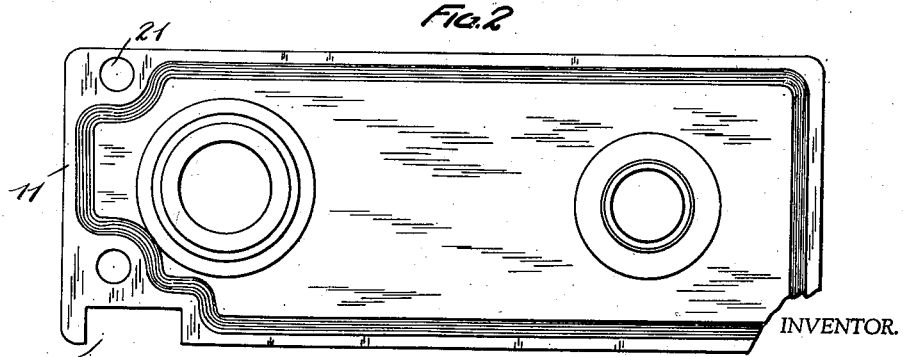
Fig. 3
INVENTOR.
CARL F. NORBERG
BY Kwis Hudson
ATTORNEYS Patented Oct. 22, 1940

2,218,621

UNITED STATES PATENT OFFICE 2,218,621

STORAGE BATTERY

Carl F. Norberg, Shaker Heights, Ohio, assignor to Willard Storage Battery Company, Cleveland, Ohio, a corporation of West Virginia Application September 7, 1938, Serial No. 228,771

3 Claims. (Cl. 136—134)

This invention relates to storage batteries and especially to an improved means of holding the battery elements against movement in the cell compartments.

The present invention has especial utility in the so-called linkless type of battery wherein the cross connectors connecting the elements of adjacent cells are not connected to terminals which extend through the cover in the usual manner and in consequence of which the covers and battery elements are not in the desired holding relation. In the ordinary battery with exposed cross connectors, each cell has two terminals which extend through the cover so that the latter can to some extent at least hold the battery element against movement. This is true particularly if the covers have embedded therein lead sealing sleeves which are designed to be lead-burned to the terminals. On the other hand, with the linkless type of battery only the two main terminals extend through and are secured to the covers of the two end cells. Accordingly, assuming that the battery has three or more cells, the covers for the inner cell or cells are virtually in no holding relation to the battery elements and the end cell covers can only to some extent hold the battery elements of such cells against movement. Consequently, if the battery is subjected to rough treatment, as when installed in an automobile or other motor vehicle, the battery elements shift relative to the cell walls and covers often with a very severe vibratory movement with the result that the sealing compound is broken first around the buried intercell connections and generally also around the margins of the covers, with consequent leakage of electrolyte.

The present invention provides a novel mode of fastening the straps of the battery elements to the covers, and while the invention is not confined to batteries of the linkless type, it is particularly useful in batteries of this type since it overcomes very effectively the disadvantage mentioned above.

In the accompanying sheet of drawings wherein I have shown an embodiment of the invention which operates with high efficiency, Fig. 1 is a top plan view of a linkless type of battery embodying my invention, the compound which is generally utilized to seal the covers in the battery case and to partially or entirely cover the cross-connections having been omitted;

Fig. 2 is an enlarged view partly in vertical section and partly in elevation showing a portion of the battery of Fig. 1, the section being taken substantially along the irregular line 2—2 of Fig. 1, the compound and separators or plate insulators being omitted;

Fig. 3 is a plan view of one of the cell covers; and

Fig. 4 is a detail perspective view showing a portion of the plates of one polarity, the strap to which the lugs of the plates are attached, and one of the cross-connecting lugs which is cast integral with the strap.

Referring now to the drawing, 10 represents the battery case which may be formed of hard rubber, so-called composition, or any other suitable material inert to electrolyte. While my invention may be applied to a battery having any number of cells, the battery here shown has three cells with individual cell covers, the covers for the two end cells being designated 11 (these two covers being identical in construction) and the middle cell cover being designated 11a, this cover being somewhat different in construction from the covers for the end cells.

The positive and the negative terminals of the battery are designated 12 and 13 respectively, these two terminals extending through the cell covers 11, 11 and being sealed therein in any desired manner. The three cells have the usual vent plugs 14, the vent plug for the middle cell being in this instance at the middle of the cover 11a and the vent plugs for the end cells being at the ends of the covers opposite the ends through which the terminals 12 and 13 extend. However, the construction and form of the venting means per se form no part of the present invention.

In each cell the plates 15 of each polarity have lugs cast integral with the strap 16 in substantially the customary manner. The battery elements composed of the plates 15 and separators (not shown) may be supported in the usual manner on bottom rests at the bottom of the cell compartments. With each of the two end cells the strap connected to the plates of one polarity will have one of the terminals 12 or 13 extending upwardly therefrom in substantially the usual manner, but in each of these end cells the strap 16 connected to the plates of the opposite polarity and the two straps connected respectively to the positive and negative plates of the middle cell have upstanding extensions 17 with lugs 18 pairs of which are adapted when lead-burned together to form the intercell connections 19. Preferably the extensions 17 project upwardly close to the partitions 10a which are, as usual, formed integral with the case 10 and form the separating walls between the cells. Preferably also the lugs 18 are fitted into suitable notches of the partitions 10a, the lugs of adjoining cells preferably contacting each other so that they can be readily lead-burned together to form the intercell connections 19. Each of the end cell covers 11 is provided at one corner with a notch 11b, and the cover 11a for the middle cell has at diagonally opposite corners similar notches to accommodate the extensions 17 of the straps 16. While I have described in detail one way of forming the intercell connections, the intercell connections may be made in other ways through or over the partitions 10a.

In accordance with the present invention the battery elements are in effect riveted to the covers. This is accomplished by casting integral with certain of the straps 16 rivets 20 (note particularly Fig. 4) which are extended through openings 21 (note Fig. 3) which are provided in depressed portions of the covers, and after the covers are fitted into the cells with the shanks of the rivets extending through these openings, the upper ends of the shanks which project through the openings are upset to form rivet heads 20a, see particularly Fig. 2.

It will be noted from Figs. 2 and 4 that near the bases of the rivets 20 shoulders 22 are provided to form seats for the depressed corner portions of the covers, as clearly shown in Fig. 2. That is to say, when the covers are inserted in the cells in assembling the battery, the covers rest on the shoulders 22, and when the upper ends of the rivet shanks 20 which extend through the openings 21 of the covers are headed, a firm riveting effect is obtained which securely fastens the covers to the straps 16 and therefore to the battery elements.

When the invention is applied to a battery of the linkless type, such as herein disclosed, both ends of the cover for the middle cell will be thus riveted to the straps beneath and the covers for the end cells at the ends opposite the terminals 12 and 13 will in a similar fashion be riveted to the straps beneath, as clearly shown in Fig. 1. After the covers have been riveted to the straps, as above explained, sealing compound will be applied so as to seal the covers in place. This sealing compound covers the rivet heads, the tops of the partitions, and the upstanding portions 17 of the straps 16, and generally it completely fills the depressed portions of the top of the battery to the level of the top of the case and to the top of the cross-connections 19 or over the same if desired.

By riveting the covers to the straps of the battery elements and thus securing them together by means which is separate or apart from the terminals of the cell, the likelihood of vibratory movement between the covers and battery elements and the consequent breaking of the seal around the intercell connections and margins of the covers is minimized.

While, in accordance with the preferred embodiment of the invention, the straps 16 are provided with two suitably positioned rivet shanks 20 so that the middle cell cover will be riveted to the straps at its four corners and the covers for the end cells will each be riveted at the two corners of one end of the cover, I do not regard it essential that there be two rivets at one or both ends of the covers for in some batteries at least the desired results can doubtless be obtained by the use of a single rivet at one or both ends of the cover, and if a single rivet is employed, it will preferably though not necessarily extend through the end of the cover on the center line thereof.

In brief, I regard the riveting of the covers to the straps to be novel regardless of the number of rivets employed to fasten each cover to the strap or straps, and, as before stated, I do not regard my invention as limited to a battery of the linkless type. Furthermore, I regard it as novel to directly fasten the cover or covers to the battery element or elements independently of the terminals and of the battery case whether by riveting or otherwise. I therefore aim in my claims to cover all modifications which do not involve a departure from the spirit and scope of the invention.

Having thus described my invention I claim:

1. In a battery cell having a casing, a cover therefor, plates in the casing, a strap connected to plates of like polarity, and a terminal on the strap not fastened to the cover, the improvement comprising a rivet integrally formed on the strap, spaced from said terminal, passing through an opening of the cover, and headed over the cover for fastening said cover and said strap together in fixed relation.

2. In a cell having a casing, a cover therefor, positive and negative plates in the casing, a pair of straps each connected to the plates of one polarity, and terminals on the straps not fastened to the cover, the improvement comprising rivets formed on the straps, spaced from said terminals, passing through cover openings, and headed over the cover for fastening the cover and the plate straps together in fixed relation.

3. In a storage battery having a plurality of cells including two end cells and an intermediate cell, a casing having different cell compartments, a cover for each compartment, plates and a pair of straps in each cell, each strap connected to plates of like polarity, a terminal on each strap, a terminal of each end cell extending through the associated cover and fastened thereto and the other terminals being unconnected with the covers, the improvement comprising rivets integrally formed on the straps whose terminals are unconnected with the covers, spaced from said terminals, passing through cover openings, and headed over the covers for fastening the covers and said straps together in fixed relation.

CARL F. NORBERG.